United States Patent [19]
Gautreau

[11] Patent Number: 5,481,842
[45] Date of Patent: Jan. 9, 1996

[54] LINKING AND ASSEMBLY BLOCK FOR PROFILED BARS AND ASSEMBLY OF BARS APPLYING IT

[76] Inventor: André Gautreau, 32, Rue de Colomb, 46100 Figeac, France

[21] Appl. No.: 70,530

[22] Filed: Jun. 3, 1993

[30] Foreign Application Priority Data

Jun. 3, 1992 [FR] France ................................. 92 06941

[51] Int. Cl.⁶ .................................................. E04C 3/00
[52] U.S. Cl. ........................ 52/656.9; 52/710; 52/726.1; 403/231; 403/258; 403/260
[58] Field of Search .................................. 52/607, 726.1, 52/726.3, 665, 710, 656.9; 403/231, 255, 171–175, 292, 252, 264, 258, 260

[56] References Cited

U.S. PATENT DOCUMENTS

| | | | |
|---|---|---|---|
| 3,265,416 | 8/1968 | Downes | 403/264 |
| 3,592,493 | 5/1969 | Goose | 52/656.9 |
| 4,073,113 | 2/1978 | Oudot et al. | 52/710 |
| 4,778,487 | 10/1988 | Chenel | 403/255 |
| 5,171,098 | 12/1992 | Jost | 403/252 |
| 5,192,145 | 3/1993 | Rixen et al. | 403/255 |
| 5,371,988 | 12/1994 | Hannes | 52/282.1 |

FOREIGN PATENT DOCUMENTS

| | | |
|---|---|---|
| 233525 | 6/1987 | European Pat. Off. . |
| 460360 | 12/1991 | European Pat. Off. . |
| 2237516 | 2/1976 | France ................................. 52/665 |
| 2653836 | 5/1991 | France . |
| 8604195 | 7/1986 | Germany . |
| 3923578 | 1/1991 | Germany . |
| 3-199703 | 8/1991 | Japan ................................. 403/292 |
| 1124373 | 8/1968 | United Kingdom .............. 52/726.1 |

*Primary Examiner*—Carl D. Friedman
*Assistant Examiner*—Kevin D. Wilkens
*Attorney, Agent, or Firm*—Sughrue, Mion, Zinn, Macpeak & Seas

[57] ABSTRACT

An assembly block and system for connecting a plurality of bars. The block has a cross-section which is the same size as the cross section of the bars. A plurality of holes are formed in the block and cutouts extend from the holes to sides of the block. The bars can be coupled in various configurations by screws which extend through the holes formed in the block. The block does not extend outside of the dimensions of the bar in cross-section.

14 Claims, 7 Drawing Sheets

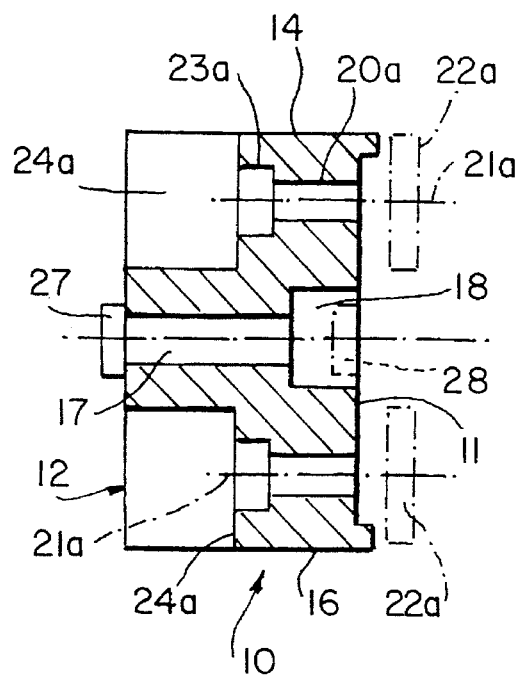 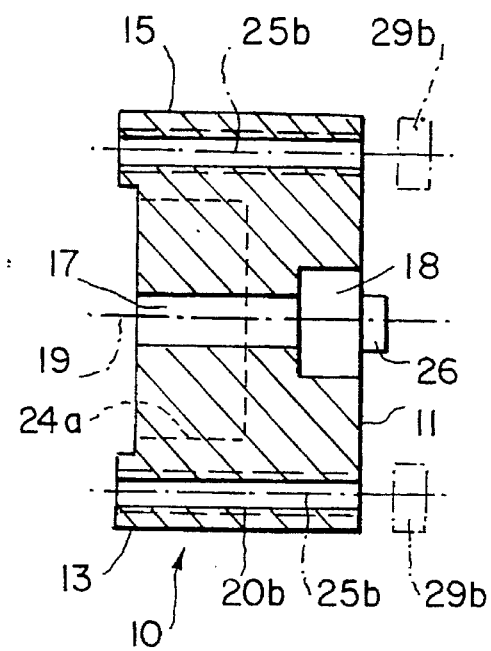
FIG.2  FIG.3
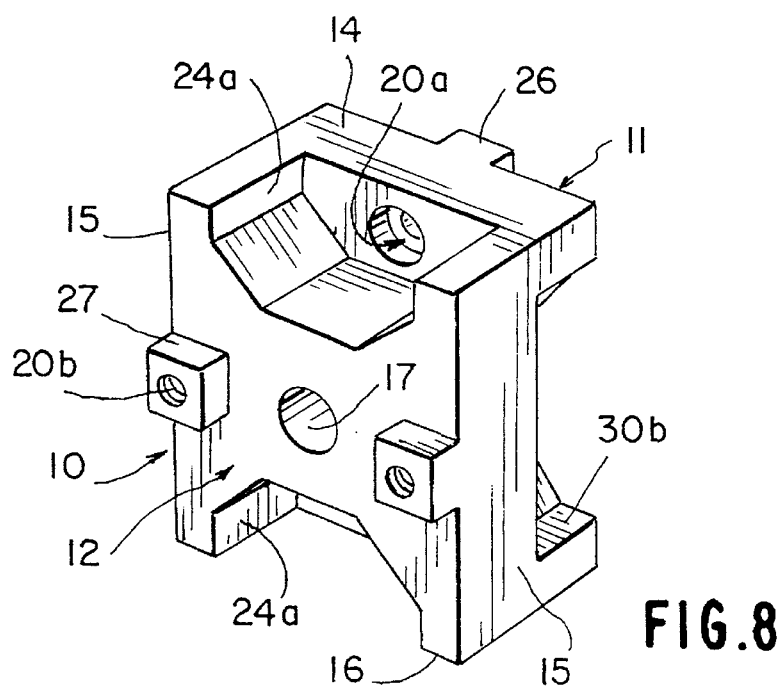
FIG.8

FIG_4
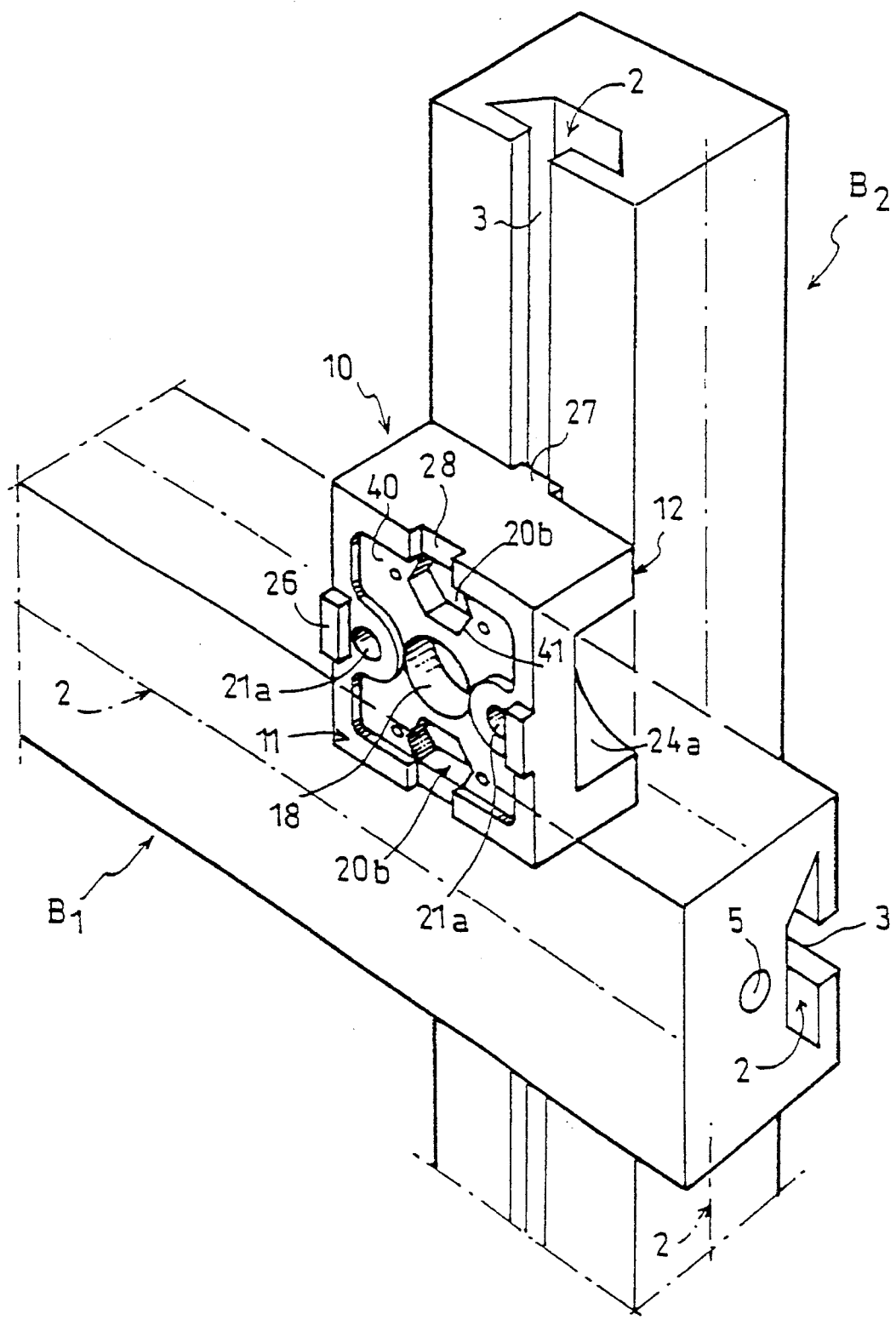

FIG_5
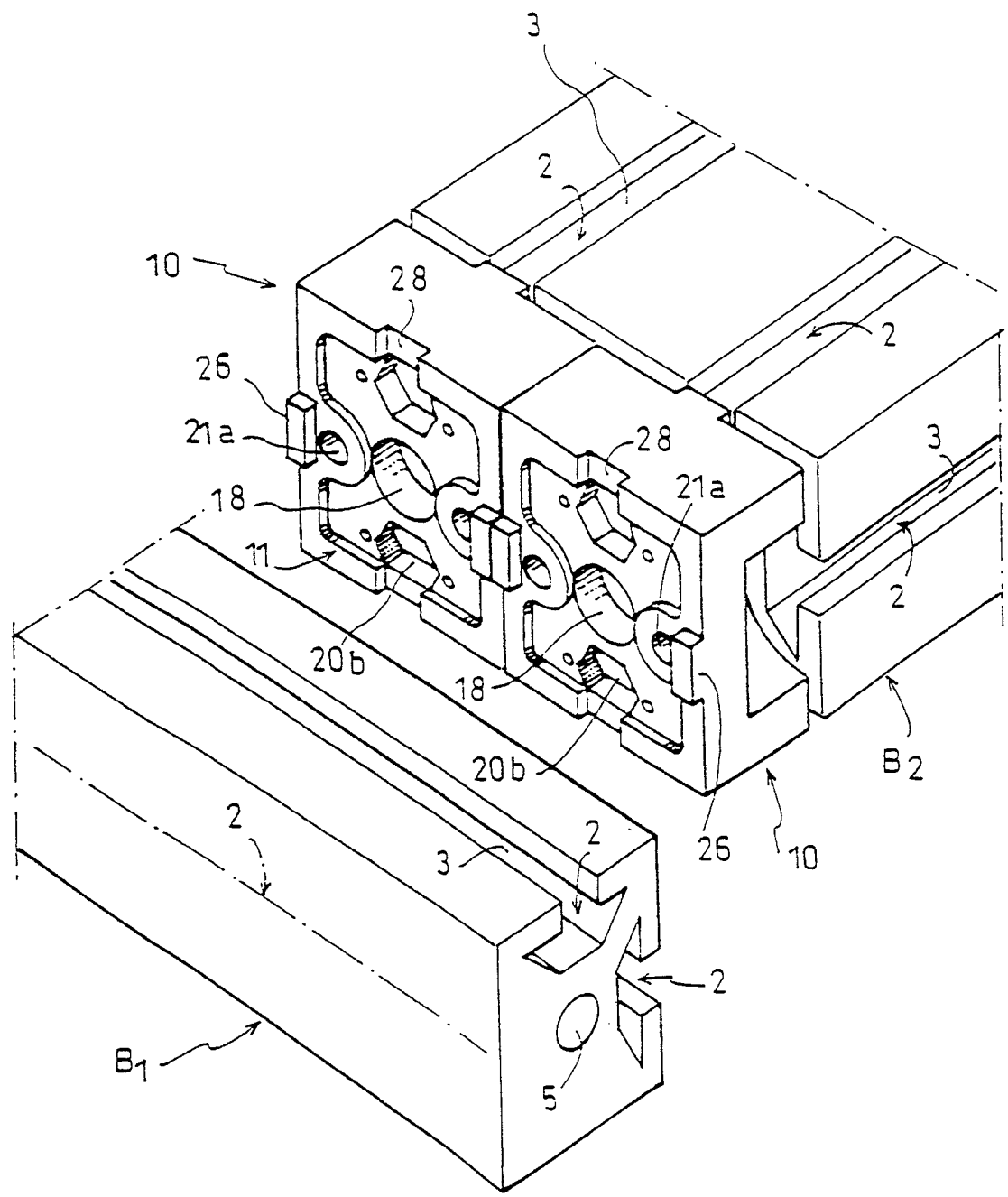

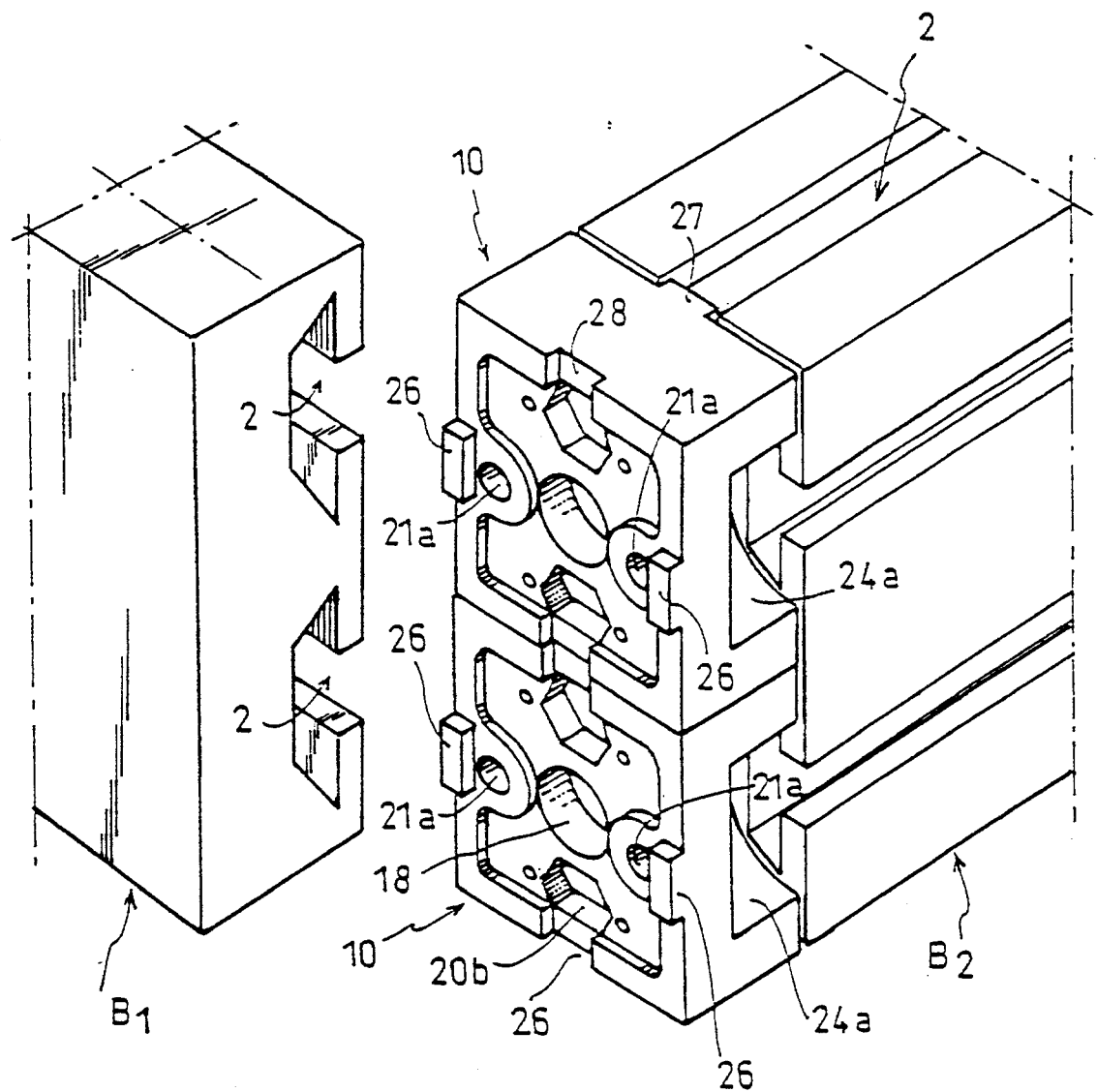
FIG_6

FIG_7
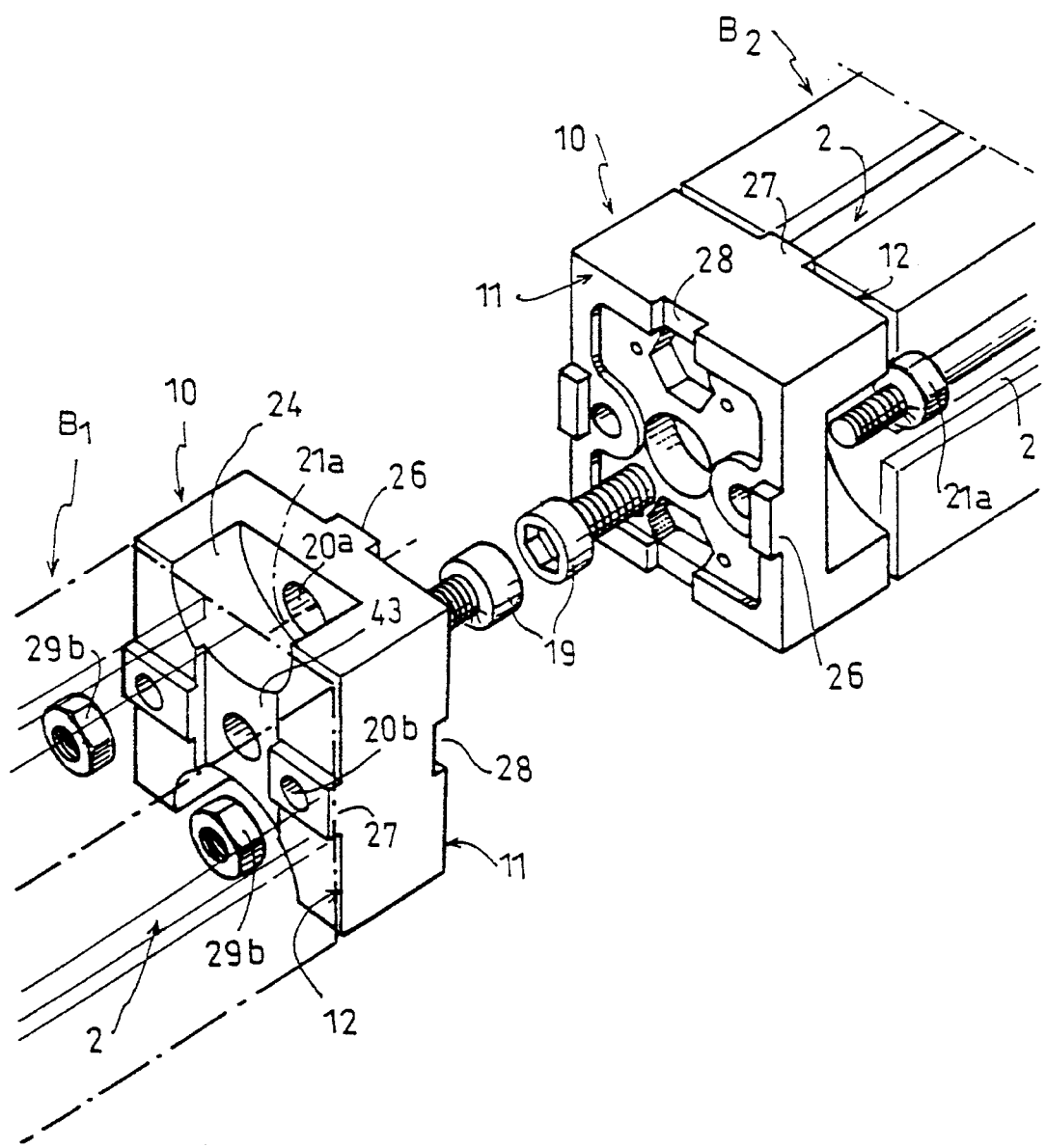

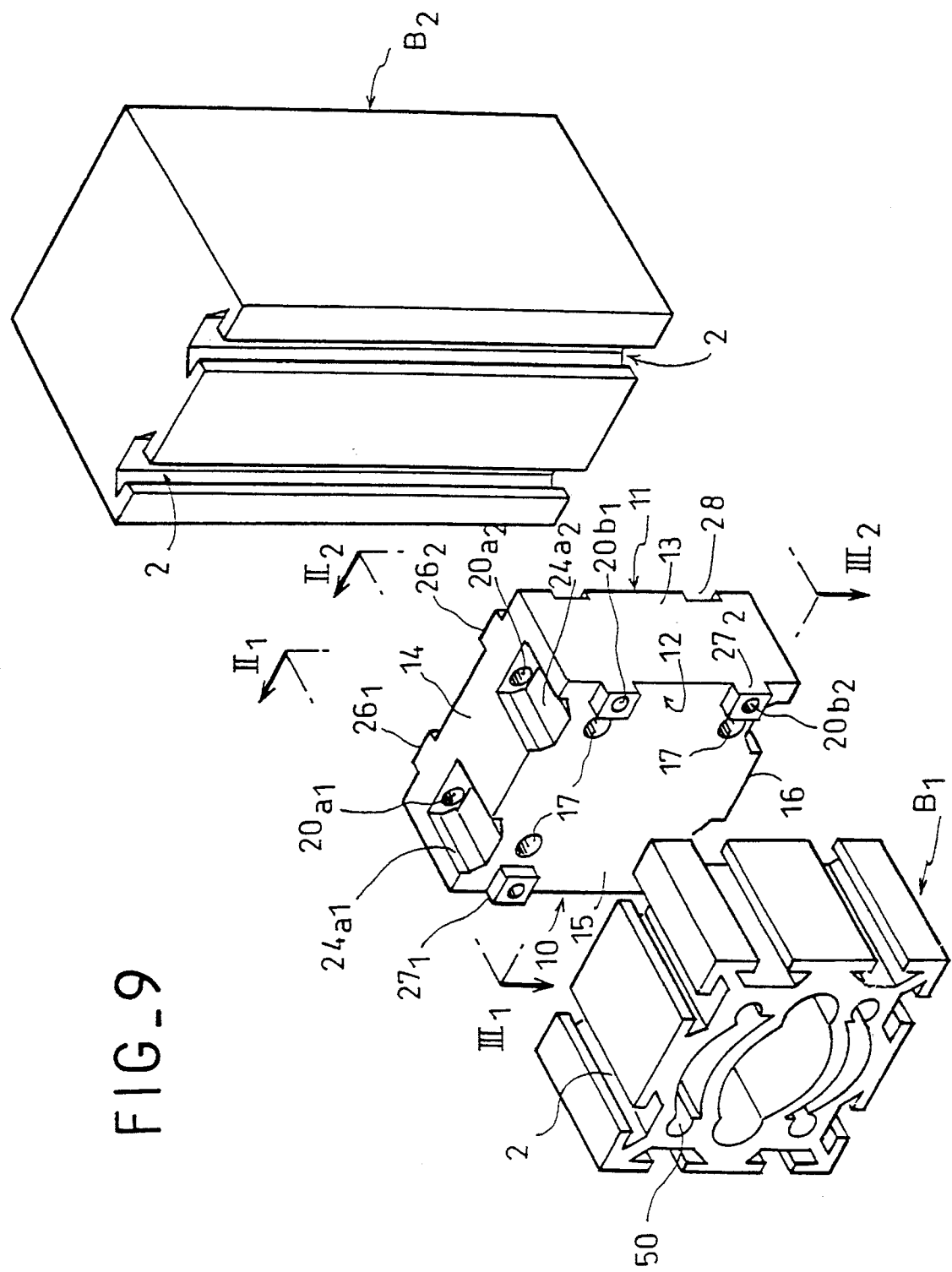
FIG_9

LINKING AND ASSEMBLY BLOCK FOR PROFILED BARS AND ASSEMBLY OF BARS APPLYING IT

BACKGROUND OF THE INVENTION

The present invention relates to the field of joining and assembly of profiled bars and it concerns more specifically the field of profiled bars with a polygonal transverse straight section comprising, on at least one of their longitudinal faces, an open T-shaped groove.

The existence of profiled bars of circular or polygonal cross section which are produced from numerous different materials and which are intended to allow the construction and erection of various structures which may range from scaffolding or the like to load-bearing frameworks of a temporary or permanent nature, right up to frames of machines with a modular or otherwise nature, has been known for some time.

Although such profiled bars without doubt have advantages of mechanical strength, relatively low economic cost, and ease of adaption, particularly by cutting to the desired length, the assembly methods known up until now are not satisfactory with respect to several points.

As a general rule, it is proposed to have recourse to sorts of yokes made up of assembly half shells which are designed to clamp two bars which are to be assembled, in order to form a joining node with the latter.

Such yokes are not esthetically convenient, technically adapted to all the assembly modes and, consequently, cannot be implemented in all applications, particularly when butt assemblies and/or assemblies in a single plane are to be provided.

Another drawback which should be taken into consideration with such structures having half-shells clamping the bars, stems from the fact that their shape, enveloping the bars, gives the assembly node produced a bulk in three dimension, which most often is a significant drawback, when it is suitable to define, using the bars, strict planes serving for example as fixing beds for various appliances or for the construction of functional modules.

Another known drawback of these joining means rests in the impossibility of making up so-called positive fixing joints practically, effectively and securely, so as to be able to oppose any risk of relative sliding of one bar with respect to the other.

Simpler means for joining bars have certainly also been proposed, providing long and costly machining operations between the faces to be joined, making it possible to insert means for fixing using a collar, screw, tie rod, etc.

Such means suffer from all the preceding drawbacks and cannot be considered as offering a quick, safe, and effective capability for assembly. Such means moreover pose practical problems when assembly must take place on a site where back-up energy, such as electricity, is missing for supplying the machining appliances.

The object of the invention is to overcome the above-mentioned drawbacks by proposing a joining and assembly block which is unique for various modes of joining likely to arise between profiled bars, such as for example a butt joint, a joint in two parallel planes, or a joint in one plane.

The subject of the invention is designed also to allow assembly nodes to be made up starting from a number of bars greater than two or even from bars whose transverse straight section represents an integer multiple of one constructive base module.

Another object of the invention is to propose a joining block which requires no machining beforehand either on itself or on the bars to be assembled, then making it possible to produce a quick, effective, positive join without the addition of energy, simply by interlocking and screwing operations.

Another object of the invention is to propose a joining and assembly block which can be manufactured easily by molding, for example as a shell, without requiring significant operations of secondary machining.

An additional object of the invention is to propose a joining and assembly block which can be inscribed inside the profile of the bars to be assembled, so as to allow joining nodes to be obtained which have the same bulk as the transverse straight section of the bars and additionally offering an esthetic nature which, although it is not fundamental for the technical features of the joint and of the assembly produced, nevertheless allows the construction and the erection of flat and pure lines, likely to offer plane faces, capable particularly of constituting support beds for the construction of sets of machines or of installations with a modular or non-modular nature.

An additional advantage attached to the joining and assembly block according to the invention stems from the fact that its implementation and its adaptation may be produced rapidly by personnel who are not necessarily highly qualified, which makes it possible to reduce the overall cost of creating, producing, and constructing a structure based on profiled bars.

In order to reach the above-defined objectives, the joining and assembly block for profiled bars of the type comprising a polygonal cross section, at least one axial passage and at least one T-shaped groove which is open on at least one longitudinal face, is characterized in that it consists of a solid body:

having, in plan view, the same shape as the polygonal cross section of the bars, defined by two lateral faces, each one provided with at least one projection whose width is equal, to within the penetration clearance, to the width of the open groove on the longitudinal face of a bar, including, starting from a lateral face, at least one counterbore extended by an opening out bore reserved for mounting a self-tapping screw with a head capable of penetrating into a corresponding passage of a bar, having orthogonal series of through holes reserved for mounting clamping and fixing screws, and having, on at least one of the faces and for the holes of one same series, hollowed cutouts, opening to the perimeter of the body and giving access to the clamping and fixing screws corresponding to the said holes.

The subject of the invention is also an assembly of profiled bars produced by means of at least one block of the above-mentioned type.

BRIEF DESCRIPTION OF THE DRAWINGS

Various other features will emerge from the description given hereafter with reference to the appended drawings which show, by way of non-limiting examples, embodiments forms of the subject of the invention.

FIGS. 2 and 3 are sections taken respectively along the planes II—II and III—III of FIG. 1.

FIGS. 4, 5, 6 and 7 are perspective views illustrating four assembly examples of profiled bars by means of the block according to the invention.

FIG. 8 is a perspective view similar to FIG. 1 illustrating an embodiment variant.

FIG. 9 is an exploded perspective view of another embodiment.

DETAILED DESCRIPTION OF THE PREFERRED EMBODIMENTS

Figure 1:
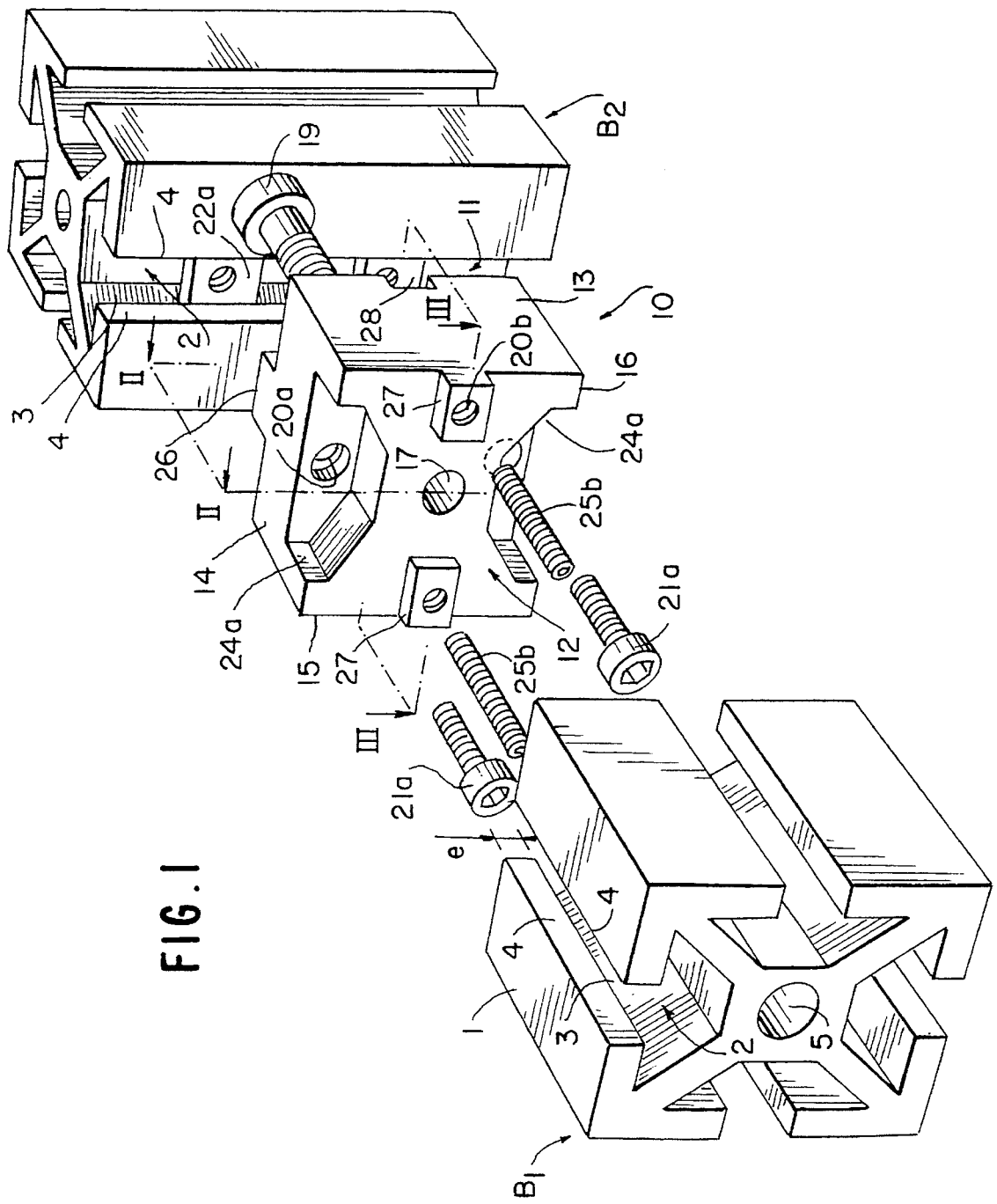
FIG. 1 is an exploded perspective view of an assembly and joining node for two profiled bars, starting from a block in accordance with the invention.

According to the first embodiment example illustrated by FIGS. 1 to 3, the joining and assembly block according to the invention is designed to allow assembly nodes to be made up between profiled bar elements, such as $B_1$ and $B_2$, having a construction and a structure which are identical or similar. In the example illustrated, each bar $B_1$ or $B_2$ is of the type with a polygonal transverse straight section, preferably square or rectangular and includes, on at least one lateral face 1, at least one inverted T-shaped groove 2 whose entrance 3 is delimited by two straight edges 4 facing each other and having a thickness e, which is preferably constant. The bars $B_1$ and $B_2$ may include only a single T-shaped groove or, as illustrated in the drawings, a T-shaped groove for each of the longitudinal faces, or even several for each face. Each bar $B_1$ or $B_2$ may also include, for manufacture or by subsequent rework, at least one passage 5, for example an axial passage, of constant straight cross section.

The joining and assembly block according to the invention is made up of a solid body 10, of rectangular parallelepipedal overall shape, defining two lateral faces 11 and 12 having a geometric shape which is preferably the same as the transverse straight section of the bar $B_1$ or of the bar $B_2$.

The solid body 10 thus has a perimeter consisting of four faces 13 to 16 joining at right angles in the example illustrated and defining the thickness of the solid body 10.

FIGS. 2 and 3 show in more detail that the solid body 10 is pierced, in its thickness and at its center, with a through bore 17 which opens onto the face 12 via a counterbore 18. The through bore 17 is made along coordinates which allow coincidence with the passage 5 when the block is located at the end of the bar $B_1$ or $B_2$. In the case illustrated, the through bore is made at the center of the transverse straight section of the block. The bore 17 and the counterbore 18 are reserved for the mounting of a self-tapping screw with a head 19 intended to provide the possible fixing, at the end of the bar element $B_1$, for example, by self-tapping engagement of the screw 19 in the axial passage 5. In such a case, the lateral face 11 of the solid body 10 is then applied onto the transverse face at the end of the bar element $B_1$.

According to another constructive arrangement, the solid body 10 is pierced along two orthogonal planes, such as the planes II and III, with two series of through holes 20a and 20b which, in the example illustrated, are provided, for each series, at equal distances on either side of the axial bore 17. The holes 20a of the first series are preferably reserved for the mounting of screws 21a interacting beyond the face 12 with one or more gib nuts 22a whose shape is chosen so as to be able to be engaged inside a T-shaped groove 2 behind the longitudinal edges 4. The gib nuts 22a may thus be provided as individual nuts for each screw 20a or, in contrast, be produced in the form of a single small bar having two tappings capable simultaneously of receiving the two screws 21a. Preferably, the holes 20a open out through counterbores 23a into access cutouts 24a which are made in the solid block 10, starting from the lateral face 12 opposite the one offering the counterbore 18 of the central bore 17, in order to open onto the transverse faces 14 and 16.

The holes 20b of the second series, orthogonal to the first, in a first example consist of tapped through passages which open out onto the two lateral faces 11 and 12 and which are intended to receive screws 25b whose axial length in one embodiment is close to but at most equal to the thickness of the solid body 10.

According to another constructive arrangement, at least one of the lateral faces 11, 12, and preferably both, include, set back and in alignment with the faces of corresponding outline, projections whose width is equal, to within the penetration clearance, to the width of the entrances 3 and whose thickness is equal to the thickness e. The projections, carrying the references 26 and 27 respectively for the faces 11 and 12, consist of prismatic masses which are preferably two in number for each face, being aligned with one another and formed facing series of holes, that is to say the series of holes 20a for the face 11 and the series of holes 20b for the face 12, being centered on the planes II and III.

Preferably, also the face 11, devoid of the cutouts 24a, has notches 28 whose shape is conjugate to the prismatic masses 27 and which are made in a similar fashion to the latter.

The block described hereinabove makes it possible to produce different types of assembly one example of which is illustrated by FIG. 1.

The block 10 may be fitted to the bar element $B_1$ by being placed at the end of this element, so that an angular joint is established by engaging the projection or projections 27 in the corresponding grooves 2, when for example the bar element $B_1$ includes a groove 2 on each of its longitudinal faces. The axial joint is provided by mounting the screw 19 in the hole 17, so as to provide a self-tapping engagement in the passage 5 allowing an effective immobilization clamping. A positive axial and angular joint is thus established.

The assembly with the bar element $B_2$ calls upon the engagement of the small bar or of the gib nuts 22a in the T-shaped groove offered by the face of the opposite element $B_2$. The prismatic masses 26 may then be engaged in this groove, so that the screws 21a can interact with the small bar or the gib nuts 22a to clamp the lateral face 11 of the block 10 against the corresponding longitudinal face of the bar element $B_2$ with effective pinching of the edges 4 between the gib nuts 22a and the face 11.

An effective angular joint and effective axial blocking between the bar element $B_2$ and the block 10 are thus established.

Additional positive axial blocking may be obtained by screwing the screws 25b into the holes 20b so that the corresponding ends, projecting from the face 11, may act as cup point screws by partially punching and clamping onto the corresponding longitudinal face of the bar element $B_2$.

It is suitable to note that the assembly node thus produced has the same bulk as the transverse straight section of the bar elements $B_1$ and $B_2$ and that it can be obtained by simple interlocking and screwing operations.

It is also convenient to note that the screws 21a are easily accessible by means of the cutouts 24a and may thus be driven rotationally on a partial angular range which is nevertheless significant, due to the opening or opening out of each cutout 24a onto the transverse faces 14 and 16. The same applies for the screws 25b which are accessible directly starting from the T-shaped grooves 2.

The implementation of the block, as said hereinabove with reference to FIG. 1, makes it possible to produce an assembly node in which the bar elements $B_1$ and $B_2$ are located in the same plane with an end joint for one of the two bars.

FIG. 4 shows another possible example for joining and assembly between the elements $B_1$ and $B_2$, now located in two parallel planes. In such a case, the block 10 may be mounted for example onto the bar element $B_2$ by means of the screws 25b whose length, which is greater than the thickness of the block, allows interaction with gib nuts 29b (FIG. 3) which are engaged in the groove 2 of the corresponding face of the bar $B_2$. As in the previous example, the gib nuts 29b may also be replaced by a small bar having two tapped holes. In such a case the tapped holes 20b are replaced by smooth holes or the screws 25b are chosen to have a diameter just less than that of the holes 20b to allow free axial displacement.

The bar element $B_1$ is then fixed onto the block 10 by means of the screws 21a interacting with the gib nuts 22a.

In such a case, the screw 19 is not mounted. It could, however, be envisaged in some cases to effect the joining of the body 10 onto the bar element $B_2$ solely by way of the screw 19 made to interact with one gib nut engaged in the groove 2, by which the block is immobilized angularly by penetration of the prismatic masses 27.

In this assembly example, the solid block 10 makes it possible to make up a node whose bulk, with the exception of the desired plane offset between the bar elements $B_1$ and $B_2$, is inscribed exactly inside the transverse section of the elements.

FIG. 5 shows one implementation example of the subject of the invention for establishing the joint between a bar element $B_1$ and two bar elements $B_2$ located side by side. Such a node is obtained then by implementing two joining blocks 10 which are mounted at the end of the two bar elements $B_2$ as discussed previously, so as to be able to be fixed next by the two end screws 21a onto the bar element $B_1$.

It must be considered that the two bar elements $B_2$ may be independent and separate or even constitute a single bar element whose transverse module is twice the unit element described with reference to FIG. 1.

FIG. 6 shows another variant, starting from two blocks 10 located at the end of two single bar elements $B_2$ or of one double bar element $B_2$, in order to establish a joining node with a bar element $B_1$ having, in transverse straight section, a module which is twice the element, according to FIG. 1, and offering two inverted T-shaped grooves 2 on one longitudinal face.

As in the example according to FIG. 5, the references carried on FIG. 6 make it possible to determine the mounting orientation of the two bodies 10 which are firstly fitted to the end of the bar element or elements $B_2$.

FIG. 7 shows another assembly example in which the bar elements $B_1$ and $B_2$, of the type of FIG. 1, are to be assembled end to end. In such a case, each bar element receives a solid body 10 mounted by means of the screw 19, so that each of them is applied to the end of the corresponding bar element via the face 12.

The fitting of each solid body 10 is produced with a 90° offset, so as to make the prismatic masses 26 of one of the solid bodies 10 interact with the notches 28 of the opposite solid body by mutual relative engagement. The bar elements $B_1$ and $B_2$ are then located end to end so as to be joined by the installation of the screws 21a screwed into the holes 20b.

As in the previous examples, a positive axial and angular assembly is thus obtained.

FIG. 8 shows an embodiment variant consisting in making cutouts $30_b$ in the face 11 by adopting a 90° offset with respect to the cutouts 24a so that the cutouts 30b open onto the transverse faces 13 and 15. FIG. 4 shows an embodiment variant consisting in making, in the face 11 for example, a recess 40 allowing a peripheral border 41 to remain which is favorable for establishing good support of the face 11 on the longitudinal face of the element $B_1$, for example.

Likewise, the holes 20b may open out into negative indentations 42 made in the bottom of the recess 40 and which are hexagonal for example, so as to receive inset captive nuts for mounting the screws 25b.

There may also be provision, as is given in FIG. 7, for making a cutout 43 in the face 12 between the projections 27 in order to promote the accumulation of chips in the event of using a self-tapping screw 19 capable of interacting with the passage 5.

FIG. 9 shows an embodiment variant of the subject of the invention adapted to the joining of bars $B_1$ and $B_2$ which include several grooves 2 on at least one longitudinal face and preferably, but not exclusively, two on each of them. In this example, it may be considered that each sector or quadrant of the transverse straight section including a longitudinal arris, has the same shape as that of the example of FIG. 1. According to FIG. 9, the intersection of the planes $P_1$ and $P_2$, passing through the grooves located on either side of one same bars, defines the axis of a passage 50 similar to the passage 5.

The joining and assembly block 10 then comprises, on the basis of the initial example but by adapting to the transverse straight section of the bars $B_1$ and $B_2$ of the example according to FIG. 2, two double series of through holes $20a_1$ and $20a_2$ provided along the planes $II_1$ and $II_2$ and $20b_1$ and $20b_2$ provided along the planes $III_1$ and $III_2$. With the holes $20a_1$ and $20a_2$ there correspond the cutouts $24a_1$ and $24a_2$ as well as the prismatic masses $26_1$ and $26_2$. Likewise, with the holes $20b_1$ and $20b_2$ there correspond the prismatic masses $27_1$ and $27_2$ as well as the notches $28_1$ and $28_2$.

The block 10 according to this example also comprises opening out bores 60 which are made so as to be placed in coincidence with the passages 50 and to allow the mounting of screws 19 engaging by self-tapping in the said passages.

The invention is not limited to the examples described and represented, because various modifications may be made thereto without departing from its scope.

What is claimed is:

1. An assembly block for joining together profiled bars, each of said profiled bars having a T-shaped groove formed in a longitudinal face thereof, said block being adapted to be attached to said longitudinal face, said block comprising:

a solid body having, in plan view, a polygonal cross section;

two lateral faces;

at least one bore extending through said block;

and at least one counterbore formed one of said lateral faces as an extension of said bore, said bore being adapted to receive a screw with a head of the screw being disposed in the counterbore;

a plurality of through holes formed in orthogonal planes in said solid body, the through holes being adapted to receive screws a plurality of cutouts in at least one of said lateral faces and extending to a perimeter of said block, the cutouts extending to respective ones of said through holes; and at least one projection on each of said lateral faces, each projection having a maximum predetermined width which is equal to or less than a width of said T-shaped groove formed in the longitudinal face of said profile bar.

2. A block according to claim 1, characterized in that the cutouts are made on the lateral face opposite the one having the counterbore or counterbores.

3. A block according to claim 2, characterized in that the lateral face opposite the one having the cutouts includes notches of conjugate shape which are aligned with the projections of the opposite lateral face.

4. A block according to claim 1, characterized in that the cutouts are made on one of the lateral faces for one of the holes and on the other lateral face for another one of the holes.

5. A block according to claim 1, wherein gib nuts are capable of being engaged in the T-shaped groove.

6. A block according to claim 1, characterized in that the screws are threadably engaged with the holes.

7. A block according to claim 1, characterized in that the projections consist of prismatic masses formed on each lateral face, said holes extending through a corresponding one of said projections.

8. A block according to claim 7, characterized in that the projections have a thickness which is at most equal to the thickness of edges of the bar defining the entrance (2) of the T-shaped groove (2) on the longitudinal face.

9. A block according to claim 1, characterized in that at least one of the faces has a set-back recess with a peripheral support border.

10. A block according to claim 1, characterized in that the holes open out onto one of said faces via indentations capable of retaining inset captive nuts.

11. A block according to claim 1, characterized in that one of said faces has a cutout between the projections.

12. An assembly block according to claim 1, wherein said bars are provided at the end with at least one of said blocks, and said blocks are securely attached to each other, wherein at least two bars are securely attached end to end by means of two of said blocks.

13. An assembly according to claim 1, wherein at least two bars extend orthogonally and are securely attached to one another by at least one of said blocks fitted onto the adjacent longitudinal faces and each of said bars having at least one of said T-shaped grooves formed therein.

14. An assembly according to claim 1, wherein at least two of said bars are securely attached end to end by means of two of said blocks.

* * * * *